March 22, 1938.    G. V. DOWNER    2,112,147

ILLUMINATING DEVICE

Original Filed March 16, 1933

Inventor,
George Victor Downer.
per,
Richard E. Babcock
Atty.

Patented Mar. 22, 1938

2,112,147

UNITED STATES PATENT OFFICE 2,112,147

ILLUMINATING DEVICE

George Victor Downer, St. Pancras, London, England

Original application March 16, 1933, Serial No. 661,138. Divided and this application July 17, 1935, Serial No. 31,939. In Great Britain July 27, 1932

2 Claims. (Cl. 240—78)

This is a division of my application for Patent No. 2,001,678, granted August 20, 1935 for illuminating devices.

The present invention relates to illuminating devices and its main object is to provide an improved device in which the light from an artificial source is distributed uniformly from a large translucent surface.

The invention essentially consists in an illuminating device comprising a source of light, means for concentrating the light from said source into a beam, a first deflecting means disposed in the beam of light for projecting the light therefrom transversely to said beam to form a sheet of light, and a second and larger deflecting means disposed in said sheet of light for projecting the light therefrom transversely to said sheet onto and through the translucent window in substantially uniform distribution.

The invention is illustrated by way of example in the accompanying drawing, wherein Fig. 1 is a diagrammatic top plan view of an embodiment of the invention in the form of a laylight, the second deflecting means partially broken away.

Figure 1:
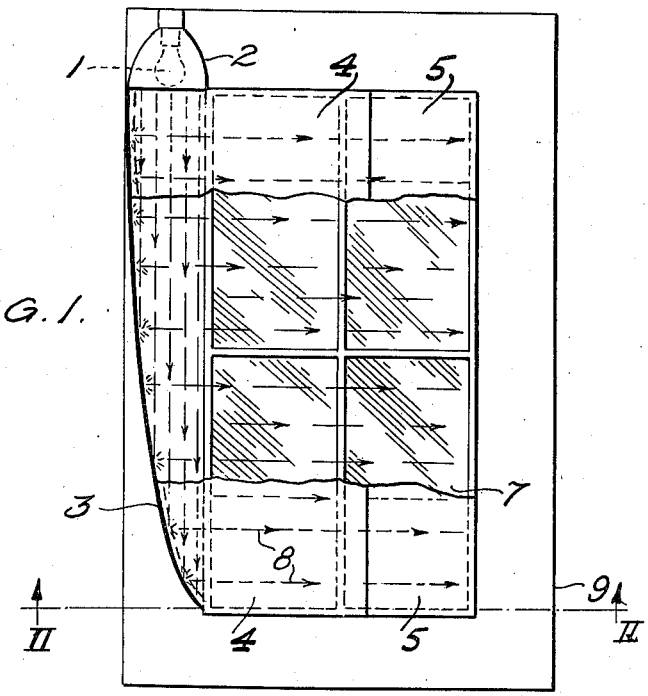
Figure 2:
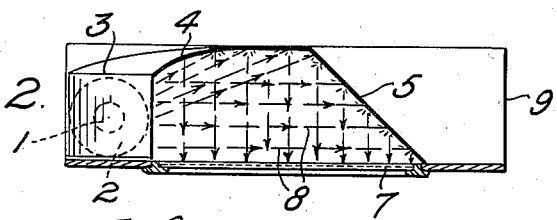
Fig. 2 is a sectional view on the line II—II of Fig. 1, looking in the direction of the arrows.

Referring to the drawing in detail, the embodiment of the invention illustrated in Figs. 1 and 2 comprises an electric lamp 1 housed in a parabolic reflector 2 adapted to concentrate the light into a parallel beam, a first deflecting means consisting of a strip of light-reflecting material 3 curved so as to distribute the light transversely to the beam and approximately evenly throughout its length in the form of a sheet or prism of light, indicated by the rays 8, and a second and larger deflecting means consisting of a curved sheet 4 of light-reflecting material and a straight sloping sheet 5 of similar material, arranged in the path of the rays 8 so as to distribute the light thereof transversely thereto, that is downwardly in Fig. 2 onto and through a translucent window 7, which may be formed of lightly diffusive glass or other material of similar properties, forming an artificial skylight or laylight or an artificial window. By this means, the light from the source 1 is progressively de-concentrated in successive steps and distributed evenly over the whole of the window 7, from which the room or space to be lighted is supplied with a well-diffused glareless and substantially shadowless illumination of maximum efficiency. The deflectors 3, 4 and 5 will preferably, though not necessarily be formed with matt white or other diffusive surfaces, and the light being thus well diffused in the course of its reflection thereby, the glass or other translucent material of window 7 can be very lightly diffusive, and will preferably be much less dense than with laylights and artificial windows as commonly used at present, wherein a plurality of small lamps are mounted directly behind the glass.

In the latter case the glass has to be heavily frosted or sandblasted or the like to minimize glare and spottiness from the lamps; said glass therefore absorbs a large proportion of the light, whereas with the present invention there need be very little loss by absorption and much greater luminous efficiency can be obtained together with more even illumination, thus providing more artistic and pleasing effects and greater comfort for the eyes.

The illuminating device of the invention as just described may conveniently be mounted in a recess 9 in the ceiling or wall of a room whereby the illuminating window 7 will be approximately flush with said ceiling or wall, or the device could be arranged in a suitable box or enclosure of similar outline to said recess which box could be secured to the ceiling or wall of a room or could be suspended or mounted in any other desired position.

Figure 3:
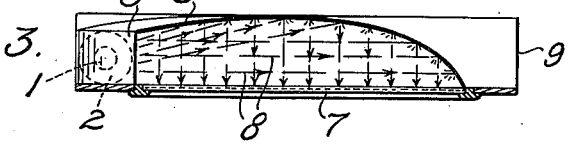
Fig. 3 is a similar view to Fig. 2 of a modification.

Fig. 3 illustrates an embodiment of the invention in which the recess or box 9 is somewhat shallower than in Fig. 2 and the sheets of light-reflecting material 4 and 5 of Fig. 2 are replaced by a single curved sheet 6, by which a still more evenly distributed illumination can be obtained in spite of the greater restriction of space.

The translucent material of window 7, as illustrated in Fig. 1, is divided into four panes, but it will be obvious that said material could equally well be formed as a single sheet or be divided into any greater or less number of panes as desired.

What I claim is:—

1. A laylight or interior illuminating device comprising a source of light, means for concentrating the light from said source into a primary beam, an elongated primary deflecting means of a width at least equal to the greatest cross-section of said primary beam taken in a plane perpendicular to its axis and of a length at least equal to the length of said beam, said primary deflecting means being disposed in said primary beam for directing the light therefrom transversely to said beam to form a secondary light beam, and a secondary deflecting means of a width at least equal to the greatest cross-section of said secondary beam taken in a plane perpendicular to the axis thereof and of a length at least equal to the total length of said secondary beam, said secondary deflecting means being disposed in said secondary beam for deflecting the light therefrom transversely to said secondary beam with a substantially uniform light distribution.

2. A laylight or interior illuminating device comprising a source of light, means for concentrating the light from said source into a primary beam, an elongated primary deflecting means of a width at least equal to the greatest cross-section of said primary beam taken in a plane perpendicular to its axis and of a length in excess of its width, said primary deflecting means being disposed in said primary beam for directing the light therefrom transversely to form a secondary beam, and a secondary deflecting means of a width at least equal to the cross-section of said secondary beam taken in a plane perpendicular to the axis thereof and of a length in excess of its width, said secondary deflecting means being disposed in said secondary beam for deflecting the light therefrom transversely to said secondary beam with a substantially uniform light distribution.

GEORGE VICTOR DOWNER.